Sept. 2, 1958 C. P. SIMLER 2,850,278

TAPE REEL

Filed June 18, 1954 2 Sheets-Sheet 1

Inventor
Charles P Simler
By L. D. Burel
Attorney

Sept. 2, 1958 C. P. SIMLER 2,850,278

TAPE REEL

Filed June 18, 1954 2 Sheets-Sheet 2

Inventor
Charles P. Simler
By L. D. Burch
Attorney

United States Patent Office 2,850,278

Patented Sept. 2, 1958

2,850,278

TAPE REEL

Charles P. Simler, Ferndale, Mich., assignor to General Motors Corporation, Detroit, Mich., a corporation of Delaware Application June 18, 1954, Serial No. 437,706

3 Claims. (Cl. 271—2.18)

This invention relates generally to continuous loop tape recorders and more particularly to data tape storage reels employed with continuous loop tape recorders and other similar devices.

Continuous loop tape recorders enable the continuous and automatic repetition of recorded pictorial or audible sequences without the normal delays incident to rewinding and rethreading the recording tape through the recording apparatus. The recording tape storage reels employed with such recorders generally receive the tape upon the inner or outer periphery of an annular roll of recorded tape and feed the tape off from the other periphery thereof. In the course of continuous operation considerable friction is built up between adjacent layers of the tape upon the reel which in turn causes excessive tension and ultimate breakage of the tape. Since continuous unattended operation is the primary purpose for using an endless loop tape recorder such failures are most undesirable.

Previously employed means for adjusting tape tension in continuous loop recorders, film projectors, and the like have not been fully acceptable in view of their failure to automatically compensate for slack or taut tape conditions without frequent inspection and adjustment. Such means have further been inadequate in their rapidity of response to varied tape conditions. A satisfactory tape tensioning device must at all times maintain sufficient tension to assure a snug winding of the tape but must yield promptly to relieve the frictional forces built up between adjacent layers of the rolled tape to prevent breakage. A further requisite lacking in previous tape tensioning means is a sturdiness of construction and simplicity of operation which will assure unattended dependability.

It is now proposed to provide a recording tape storage reel for use with loop recorders and other similar devices which includes means for automatically compensating for excessive tape tension built up in such devices over long periods of continuous operation. Such tape storage reels may be readily exchanged with reels employed with continuous loop tape devices now in use for greatly improving the operation of such devices. The proposed tension adjusting means is adapted to maintain sufficient tape tension to assure a firm roll of tape upon the storage reel at all times. The absence of excessive slack prevents scratching of the tape by relative movement of adjacent layers of tape. The self tension compensating means further prevents snap breakage of the tape in a too rapid take-up of slack. The absence of intricate and complicated parts assures operation without concern for failure of the tension adjusting means itself. The proposed invention is simple and sturdy in construction, is inexpensive to manufacture and assemble and is dependable for long uninterrupted operation without attendance.

Figure 1:
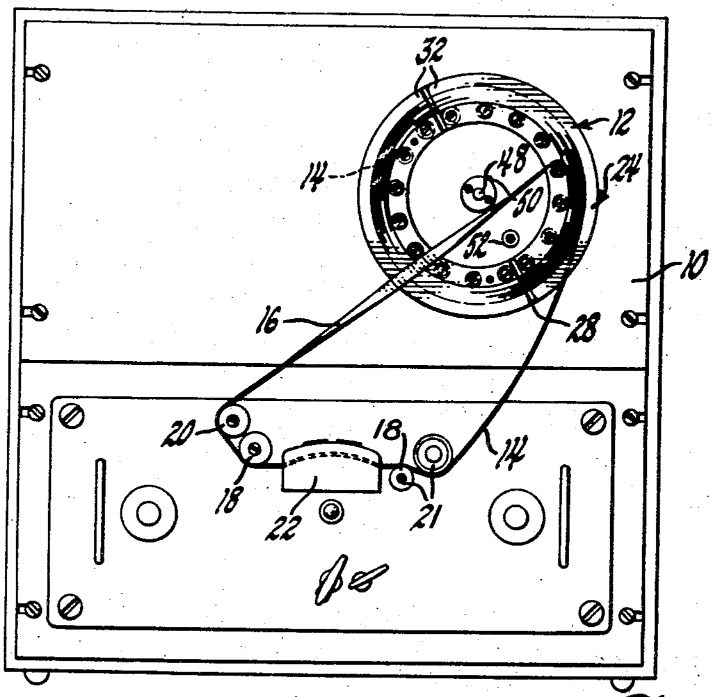
Figure 1 is an illustration of a continuous loop tape recorder employing a data tape storage reel embodying the principles of this invention.
Figure 2:
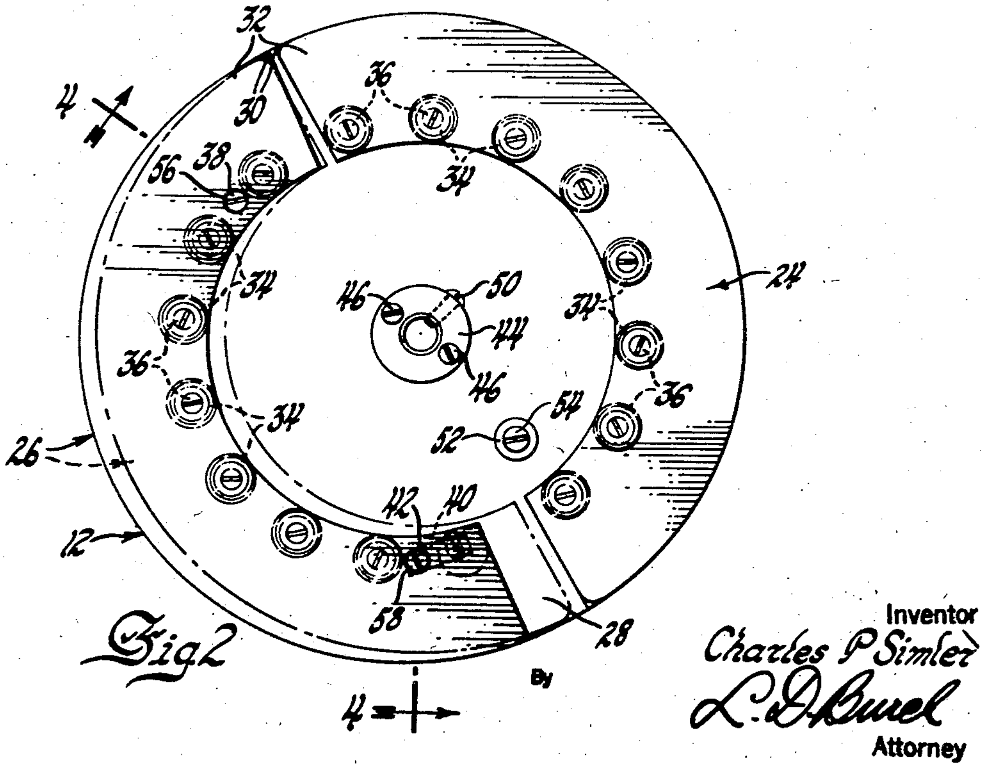
Figure 2 is an enlarged illustration of the data tape storage rel shown in Figure 1.

A tape recorder instrument 10 is shown in Figure 1 which includes a storage reel or spool 12 having a continuous and endless loop of recorded tape 14 wound thereon. The tape 14 is first wound upon the reel 12 and the free ends are later spliced together. The exposed portion 16 of the loop of tape not wound on the reel 12 is threaded over rollers 20, through a recording or pick-up head 22, and over a feed sprocket or drive capstan 18, and pressure roller 21.

Figure 3:
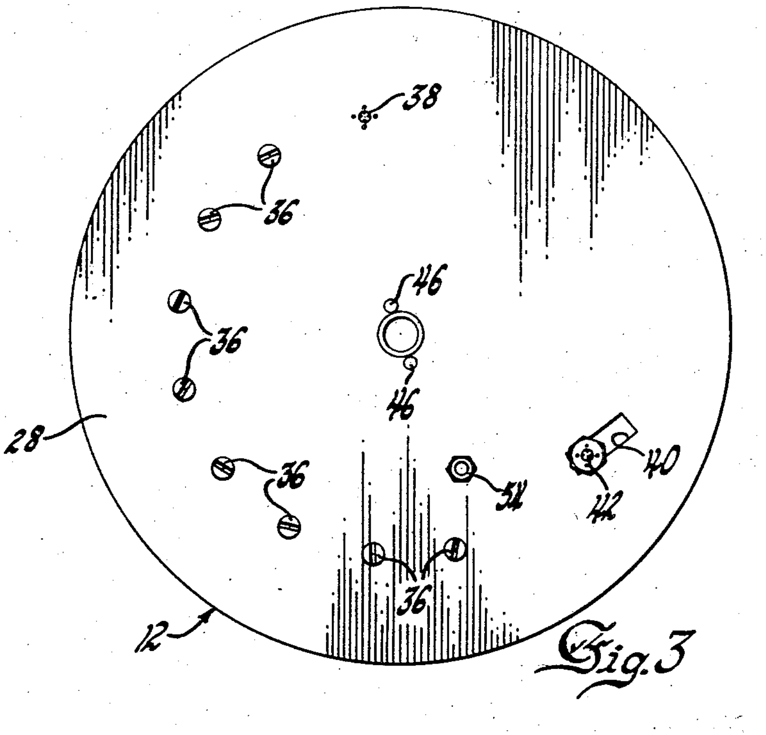
Figure 3 is a back view of the data tape storage embodying the principles of this invention.
Figure 4:
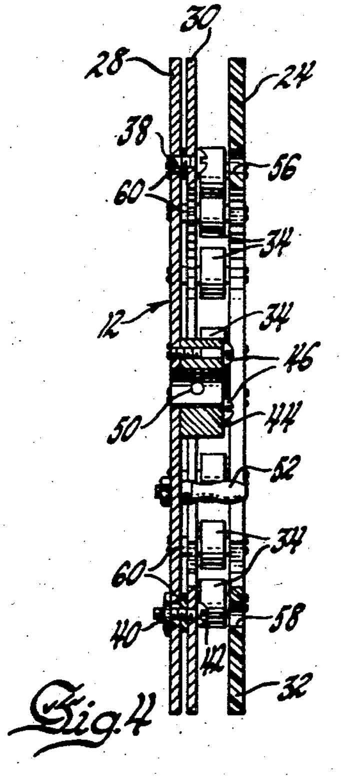
Figure 4 is a cross section view of the reel of Figure 2 taken in the plane of line 4—4 and viewed in the direction of the arrows thereon.

The tape reel or spool 12 is formed of two parts 24 and 26 secured to a cirlular backing plate 28. The two parts 24 and 26 each comprise semi-annular plates 30 and 32 disposed in parallel relation with a plurality of rollers 34 mounted between the plates near the inner peripheries thereof. Together the two parts 24 and 26 form the complete spool 12 receiving the tape 14 upon the rollers 34 with the semi-annular plates 30 and 32 acting as flanges to cause the tape to build up layer after layer upon the rollers. One part 24 of the split reel is secured to the backing plate 28 by extending the bolt or screw means 36 upon which the rollers 34 are mounted through the backing plate as shown in Figure 3. The other part 26 of the split reel is pivotally mounted by screw means 38 upon the backing plate 38 near one end of the secured or fixed half 24 of the reel. The free or floating end of the pivotally mounted part 26 of the reel is limited to travel within the confines of an elongated slot or guide 40 formed in the backing plate 28 and receiving limit or stop bolt means 42 secured to the pivotal half 26 of the reel.

The backing plate 28 includes a hub member 44 secured centrally thereon by screws 46 and is adapted to be disposed upon a mounting shaft 48 provided on the face of the recording instrument 10. The backing plate is spaced from the face of the recorder 10 and vertically disposed substantially in alignment with the recording head 22 and its rollers by a shoulder on the shaft or spacer means not here shown to assure proper alignment of the tape in passing through the recording head. A set screw 50 extended through the hub 44 or any other convenient means may be employed to lock the reel 12 to the mounting shaft 48. A handle 52 is secured to the front of the backing plate 28 by screw 54 to enable rotation of the backing plate upon the mounting shaft 48 as desired for winding the tape 14 upon the reel 12 or adjusting the position of the free end of the pivotal half 26 of the reel as hereafter described.

The outermost semi-annular plates 32 may be transparent as shown to enable visual inspection of the tape 14 as wound upon the rollers 34. Openings 56 and 58 may be provided through the one semi-annular plate 32 of the pivotal half 26 of the reel over the pivot screw or pin 38 and limit or stop member 42 to enable access thereto for adjustment purposes.

The pivotal part 26 of the reel is held out from the backing plate 28 as is the secured or stationary part 24 of the reel by shims or spacers 60. The spacers 60 on the fixed half 24 of the reel are disposed about the roller retaining bolt means 36 and those for the pivotal half 26 of the reel about the pivot pin 38 and limit stop or bolt 42.

In setting up the recording instrument 10 for use the limit bolt or screw 42 is first centered in the guide slot 40 and tightened after which the recorded tape 14 may be wound upon the rollers 34 by loosening the set screw 50 of the hub 44 and rotating the reel 12 by the handle 52. The ends of the tape 14 are spliced together to form an exposed loop 16 of tape which is threaded through the pick-up head 22. With the recording instrument 10 in operation, the tape 14 feeding off from the inner periphery of the roll of tape on the reel 12 between two of the rollers 34 and back upon the outer periphery thereof, the storage reel 12 is rotated to align the tape properly between the reel 12 and capstan of feed sprocket drive 18. The tape 14 is fed off from the reel half 24 secured to the backing plate 28 and over the semi-annular plate 32 of the pivotal half 26 of the reel. The pivotal part 26 of the reel, now the lower half, is rotated at the same time to dispose the relatively free end thereof somewhere between top center and 180° in accordance with the tension desired to be applied to the tape 14 wound on the reel. The limit bolt or screw 42 extending through the guide slot 40 is then loosened and the set screw 50 through the hub 44 is tightened to hold the reel in the selected position.

The roll of recorded tape 14 wound upon the rollers 34 of the reel 12 will rotate upon the rollers as the tape feeds off from the inner periphery of the roll and back upon the other periphery thereof. The pivotal half 26 of the reel is adapted to pivot inwardly towards the fixed part 24 of the reel to relieve tape tension within the tape roll and the weight of the free end of the pivotal half is adapted to apply yieldable outward tension to assure a firm roll of tape. The weight of the free end of the pivotal half 26 of the reel 12 which is adapted to exert the outward tensioning force is dependent upon the disposition of the free end. The tensioning force is small with the disposition of the free end in the position shown in the illustrations as compared to what it would be with the free end between top center and 90° therefrom.

As the operation of the recording instrument continues the free end of the pivotal half of the reel will move inwardly or outwardly automatically to vary the circumferential dimension about the rollers and relieve the tension between adjacent layers of tape wound upon the reel.

I claim:

1. A data tape storage reel for use with a continuous loop tape recorder and which includes a vertically mounted backing plate having complementary semi-circular reel halves mounted thereon, said reel halves each including a plurality of roller means mounted upon their respective outer semi-circular periphery and adapted to receive a continuous winding of data tape thereon, one of said reel halves having one end thereof pivotally mounted to said backing plate and the other end thereof disposed for relative movement in the plane of the other of said reel halves, said backing plate being rotatably adjustable for selectively positioning said other end of said one reel half for variable gravitational assistance in yieldably outwardly tensioning said tape wound about said reel halves.

2. A data tape storage reel for use with a continuous loop tape recorder and which includes vertically mounted semi-circular reel halves, said reel halves each including a plurality of roller means mounted upon their respective outer periphery and adapted to receive a continuous winding of data tape thereon, one of said reel halves having one end thereof pivotally mounted relative to the other of said reel halves and having the other end thereof disposed for relative movement in the plane of the other of said reel halves, said reel halves being rotatably adjustable together for selectively positioning said other end of said one reel half for variable gravitational assistance in yieldably outwardly tensioning said tape wound about said reel halves.

3. A data tape storage reel for use with a continuous loop tape recorder and which includes vertically mounted complementary semicircular reel halves, said reel halves being adapted to receive a continuous winding of data tape upon the outer periphery thereof and having said tape dispensed from the inner periphery of said winding in the course of tape movement relatively about said reel halves, one of said reel halves having one end thereof pivotally mounted relative to the other of said reel halves and having one end thereof disposed for relative movement in the plane of the other of said reel halves, and said reel halves being rotatably adjustable together for selectively positioning said relatively movable end of said one reel half for variable gravitational assistance in yieldably outwardly tensioning said tape wound about said reel halves and for permitting yielding retraction thereof inwardly of said reel halves as required to relieve the tension within the inner periphery of said winding from which said tape is dispensed.

References Cited in the file of this patent

UNITED STATES PATENTS

| | | |
|---|---|---|
| 668,107 | Loscher | Feb. 12, 1901 |
| 2,290,447 | Price | July 21, 1942 |
| 2,318,316 | Lawrence | May 4, 1943 |
| 2,631,035 | Eddy | Mar. 10, 1953 |

FOREIGN PATENTS

| | | |
|---|---|---|
| 169 | Great Britain | Jan. 22, 1856 |